US011733358B2

(12) United States Patent
Couillault et al.

(10) Patent No.: US 11,733,358 B2
(45) Date of Patent: Aug. 22, 2023

(54) ELECTRONIC CIRCUIT AND TIME-OF-FLIGHT SENSOR COMPRISING SUCH AN ELECTRONIC CIRCUIT

(71) Applicant: VALEO COMFORT AND DRIVING ASSISTANCE, Créteil (FR)

(72) Inventors: Jérôme Couillault, Créteil (FR); Peter Gratzl, Créteil (FR)

(73) Assignee: VALEO COMFORT AND DRIVING ASSISTANCE, Créteil (FR)

( * ) Notice: Subject to any disclaimer, the term of this patent is extended or adjusted under 35 U.S.C. 154(b) by 1192 days.

(21) Appl. No.: 16/338,670

(22) PCT Filed: Sep. 18, 2017

(86) PCT No.: PCT/EP2017/073512
§ 371 (c)(1),
(2) Date: Apr. 1, 2019

(87) PCT Pub. No.: WO2018/050897
PCT Pub. Date: Mar. 22, 2018

(65) Prior Publication Data
US 2019/0227146 A1    Jul. 25, 2019

(30) Foreign Application Priority Data

Sep. 16, 2016  (FR) ...................... 1658704

(51) Int. Cl.
*G01S 7/484*    (2006.01)
*G01S 17/894*    (2020.01)
(Continued)

(52) U.S. Cl.
CPC ............. *G01S 7/484* (2013.01); *G01S 7/483* (2013.01); *G01S 17/894* (2020.01);
(Continued)

(58) Field of Classification Search
CPC ........ G01S 7/484; G01S 17/894; G01S 7/483; G01S 17/931; H05B 45/345; H05B 45/327; Y02B 20/30
See application file for complete search history.

(56) References Cited

U.S. PATENT DOCUMENTS

| 6,057,777 A * | 5/2000 | Dunne .................... B66C 13/46 340/436 |
| 2006/0000967 A1* | 1/2006 | Kuijk .................... G01S 7/4868 250/221 |

(Continued)

OTHER PUBLICATIONS

International Search Report and Written Opinion issued in corresponding International Patent Application No. PCT/EP2017/073512, dated Jan. 2, 2019 (19 pages).

*Primary Examiner* — Maria E Vazquez Colon
(74) *Attorney, Agent, or Firm* — Osha Bergman Watanabe & Burton LLP

(57) ABSTRACT

An electronic circuit comprises at least one radiation-emitting element (2), a current regulator (12) with a current-producing terminal (O), and a measurement element (14) generating a signal ($V_{mes}$) that is representative of the current flowing therethrough. A switch (6) is controlled by a modulation signal (M) so as to open and close, successively, an electrical path passing through the current-producing terminal (O), the radiation-emitting element (2) and the measurement element (14). A conversion circuit (16) is further interposed between the measurement element (14) and the current regulator (12) so as to transform the representative signal ($V_{mes}$) into a smoothed signal (S) that is intended for a regulation terminal (Reg). A time-of-flight sensor comprising such an electronic circuit is also provided.

12 Claims, 1 Drawing Sheet

(51) Int. Cl.
*H05B 45/327* (2020.01)
*H05B 45/345* (2020.01)
*G01S 7/483* (2006.01)
*G01S 17/931* (2020.01)

(52) U.S. Cl.
CPC ......... *H05B 45/327* (2020.01); *H05B 45/345* (2020.01); *G01S 17/931* (2020.01); *Y02B 20/30* (2013.01)

(56) References Cited

U.S. PATENT DOCUMENTS

| | | | |
|---|---|---|---|
| 2007/0268239 A1 | 11/2007 | Lin et al. | |
| 2010/0243897 A1 | 9/2010 | Madhani et al. | |
| 2010/0244795 A1* | 9/2010 | Madhani | H05B 45/12 315/307 |
| 2014/0084810 A1* | 3/2014 | Bette | G01S 17/894 315/294 |
| 2014/0211192 A1* | 7/2014 | Grootjans | H02M 7/42 356/5.01 |
| 2014/0293038 A1* | 10/2014 | Delmonico | H05B 45/3725 348/82 |
| 2014/0312233 A1* | 10/2014 | Mark | G01J 1/46 250/341.8 |
| 2015/0268343 A1* | 9/2015 | Uehira | G01S 17/10 356/5.01 |

* cited by examiner

ELECTRONIC CIRCUIT AND TIME-OF-FLIGHT SENSOR COMPRISING SUCH AN ELECTRONIC CIRCUIT

TECHNICAL FIELD TO WHICH THE INVENTION IS RELATED

The present invention relates to the power supply of the radiation-emitting elements used, for example, in time-of-flight sensors.

It relates more particularly to an electronic circuit and a time-of-flight sensor comprising such an electronic circuit.

The invention applies particularly advantageously in the case where it is desired to obtain good repeatability of the signal emitted by the time-of-flight sensor.

TECHNOLOGICAL BACKGROUND

In time-of-flight sensors ("ToF sensor" or "Time-of-Flight Sensor"), a radiation-emitting element, such as a light-emitting diode, emits a given signal, intended to be detected by a receiving element after reflection on an object. Thus the distance of the object may be assessed on the basis of the time elapsed between the emission of the signal and its reception at the receiving element.

In order to achieve efficient operation, the emitted signal is modulated at high frequency. The emitting element must thus be traversed by a current formed of high frequency pulses and of a relatively high level, with very short rising and falling edges.

These significant variations in the high frequency current a priori prevent the use of a current regulator, the regulation loop of which has a characteristic time greater than the duration of the aforementioned pulses.

Therefore a voltage-regulated power supply and a resistor transforming this voltage into current are frequently used for powering the radiation-emitting element.

However, this solution involves heating and a loss of efficiency due to the Joule effect in the aforementioned resistor, a current drift linked to the voltage drift of the light-emitting diode with temperature and an inaccuracy of the current obtained linked to the variability of the voltage at the terminals of the light-emitting diode from one product to another.

SUBJECT MATTER OF THE INVENTION

In this context, the present invention provides an electronic circuit comprising at least one radiation-emitting element, a current regulator with a regulation terminal and a current-producing terminal, connected to the radiation-emitting element, a measuring element producing a signal representative of the current flowing therethrough, a switch controlled by a modulation signal so as to successively open and close an electrical path passing through the current-producing terminal, the radiation-emitting element and the measuring element, and a conversion circuit interposed between the measuring element and the current regulator, and designed for transforming the representative signal into a smoothed signal (without modulation) intended for the regulation terminal.

Thanks to the conversion circuit, the regulation of the current at the current regulator will not be affected by the current interruptions caused by the switch under the control of the modulation signal.

Such a circuit is thus used to power the radiation-emitting element with a constant current and to control a modulation of the current in the high-frequency emitting element, as provided, for example, in a time-of-flight sensor.

The emitting element is, for example, a light-emitting diode; the radiation emitted by the emitting element may be, in this case notably, an infrared radiation.

In some embodiments, such as that described below, a plurality of emitting elements may be provided mounted in series on the electrical path.

The measuring element may in practice be a resistor, in which case the signal representative of the current is the voltage at the terminals of this resistor.

The conversion circuit is, for example, a low-pass filter. In this case, such a low-pass filter may have a cutoff frequency lower than the frequency of the modulation signal.

As a variant, the conversion circuit could be a peak detector, or an assembly formed of an analog-to-digital converter and a processor.

Such a modulation signal is, for example, a periodic signal, here with a period less than 100 ns.

The invention also provides a time-of-flight sensor comprising an electronic circuit such as that provided above.

Such a time-of-flight sensor may further comprise a receiving element, such as a receiving array (comprising a plurality of pixels). The receiving element may then be designed for receiving, after reflection, the radiation emitted by the radiation-emitting element. Such a time-of-flight sensor forms a three-dimensional camera.

DETAILED DESCRIPTION OF AN EMBODIMENT

The following description with reference to the appended drawings, given by way of non-restrictive examples, will elucidate what form the invention takes and how it may be implemented.

A time-of-flight sensor, such as a three-dimensional camera based on the time-of-flight principle ("ToF 3D camera" or "Time-of-Flight 3D camera"), comprises at least one electromagnetic radiation-emitting element 2 (typically one or more light-emitting diode(s) emitting in the infrared) and an electromagnetic radiation-receiving element 4, such as a receiving array formed of pixels.

Figure 1:
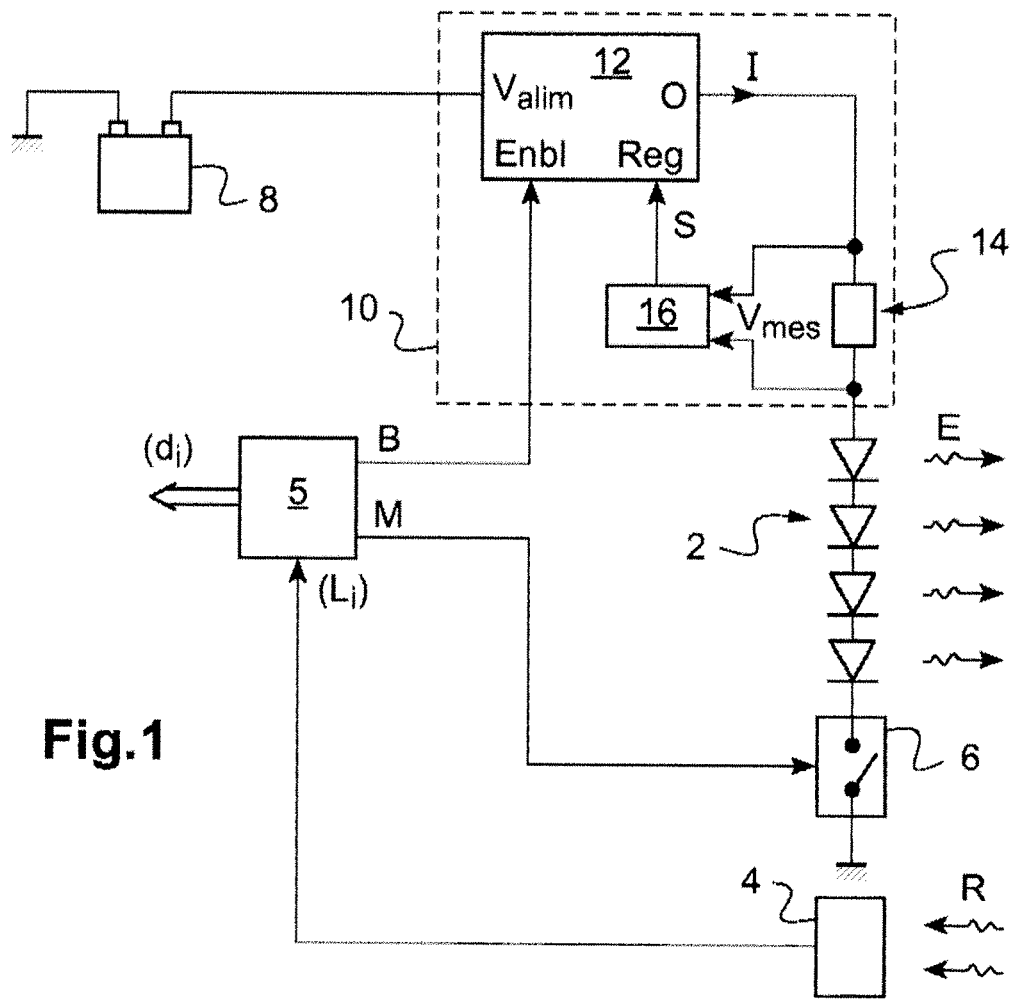
FIG. 1 represents an electronic circuit of a time-of-flight sensor.

The radiation E emitted by the emitting element 2 (generally through an optical emission system not represented in FIG. 1) is reflected in the direction of the receiving element 4 (reference R in FIG. 1) by the first object encountered on the path of the radiation E.

By measuring the time between the emission of a signal provided by the emitting element 2 and the reception of a corresponding signal by the receiving element 4, the distance may be assessed of the aforementioned first object encountered.

In the previously mentioned case where the receiving element 4 is a receiving array, a receiving optical system (such as a lens) is placed opposite the receiving element 4 so that each pixel of the receiving element 4 receives the reflected signal R originating from a particular direction of the solid angle analyzed by the time-of-flight sensor.

As can be seen in FIG. 1, a control unit 5 (e.g. a microcontroller) controls the emission of the radiation E by the emitting element 2, as described below, then analyzes the signals $L_i$ measured by the receiving element 4 (here for the different pixels of the array) so as to determine the distance $d_i$ of the first object encountered (here for a plurality of spatial directions facing the time-of-flight sensor) according to the principle mentioned above.

This distance $d_i$ (or these distances $d_i$) Is (are) transmitted by the control unit 5 to another electronic system (not represented) for use by the latter.

For example, in the automotive field, the time-of-flight sensor may be placed at the front of the vehicle in order to construct a mapping of the forward environment of the vehicle and/or to detect an obstacle and/or to assess the speed of another vehicle located in front (by derivation from the distance $d_i$).

According to another feasible possibility, the time-of-flight sensor may be placed in the passenger compartment of the vehicle (e.g. facing the driver of the vehicle) and the distances di determined by the control unit 5 may be used within a gesture recognition algorithm.

As represented in FIG. 1, the emitting element 2 is powered (in electric current) by a power supply circuit 10.

Figure 3:
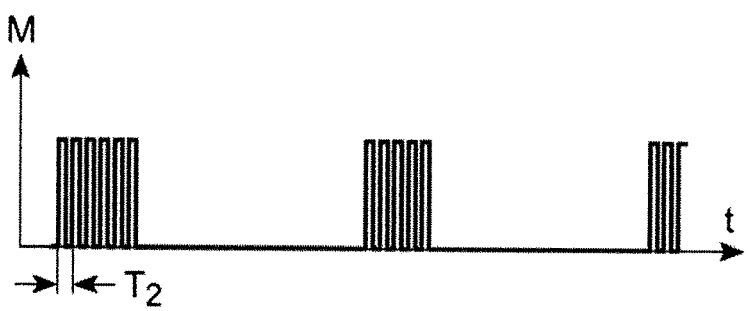
FIG. 3 represents a second electrical signal used in the electronic circuit of FIG. 1.

A controlled switch 6 is also mounted in series with the power supply circuit 10 and the emitting element 2 in order to be able to generate (under the control of a modulation signal M produced by the control unit 5 and represented in FIG. 3) a modulation of the radiation E emitted by the emitting element 2. Such a modulation is used as part of the operation of the time-of-flight sensor in order to emit a signal recognizable by the receiving element 4 (after reflection on the first object encountered).

The power supply circuit 10 comprises a current regulator 12, a measuring element 14 and a conversion circuit, here a low-pass filter 16.

The current regulator 12 comprises a power supply terminal $V_{alim}$ connected to a terminal of the battery 8 of the vehicle, an activation terminal Enbl, a regulation terminal Reg and an output terminal O where the current I produced by the current regulator 12 is delivered.

The current regulator 12 is designed for delivering on the output terminal O, when a predetermined voltage is present on the activation terminal Enbl, a current I regulated according to the voltage present on the regulation terminal Reg.

The measuring element 14, here a resistor, is mounted in series with the emitting element 2 and the controlled switch 6 between the output terminal (or current-producing terminal) O and the ground of the electronic circuit (connected in its turn to the other terminal of the battery 8 of the vehicle as depicted in FIG. 1).

The measuring element 14 thus supplies a signal (here the voltage $V_{mes}$ at the terminals of the measuring element 14) representative of the current flowing through this measuring element 4.

This signal $V_{mes}$ is transmitted to the regulation terminal of the current regulator 12 through the conversion circuit, i.e. here through the low-pass filter 16. Thus, the low-pass filter 16 transmits on the regulation terminal Reg a smoothed signal S, limited here to the low-frequency components of the representative signal $V_{mes}$.

As a variant, the conversion circuit 16 could be a peak detector. Such a peak detector also enables it to transmit on the regulation terminal Reg a smoothed signal S, free of the variations present in the signal $V_{mes}$ due to the modulation of the current I by the controlled switch 6 under the control of the modulation signal M.

According to yet another variant, the conversion circuit 16 could include an analog-to-digital converter (capable of converting the signal $V_{mes}$ into a data sequence) and a processor (capable of generating, on one of its output terminals, a smoothed signal S produced by digital processing on the basis of the aforementioned data sequence).

The measuring element 14, the conversion circuit 16 and the regulation terminal Reg form a regulation loop or feedback loop, of the current regulator 12 for obtaining a predetermined current I on the output terminal O.

The operation of the electronic circuit that has just been described, is set out below.

Figure 2:
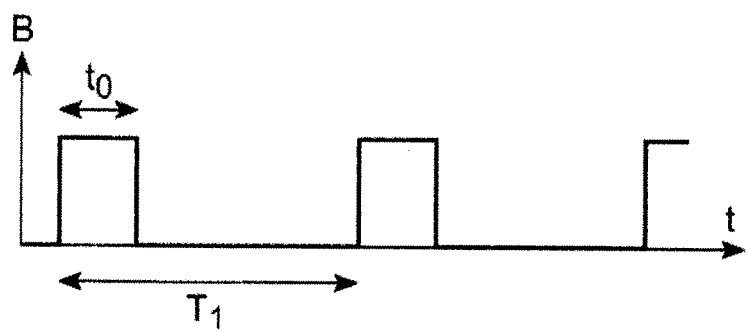
FIG. 2 represents a first electrical signal used in the electronic circuit of FIG. 1.

In order to emit a burst of radiation E by the emitting element 2, the control unit 5 periodically orders (with a period $T_1$) the activation of the current regulator 2 for a predetermined duration $t_0$, here by applying on the activation terminal Enbl of the current regulator 12 a corresponding signal B (formed as represented in FIG. 2 of a periodic voltage step of duration $t_0$ and period $T_1$). Thus $t_0 < T_1$.

During these activation ranges of the current regulator 12, the control unit 5 further transmits the already mentioned modulation signal M to a control terminal of the controlled switch 6 in order to allow (successively and repeatedly) the opening and closing of the controlled switch 6 in accordance with the modulation signal M (an example of which is represented in FIG. 3).

The modulation signal M is, for example, a periodic square wave signal of period $T_2$ with generally $T_2 < 0.1.t_0$ (and therefore $T_2 < 0.1.T_1$). It is noted in this regard that FIG. 3 is purely illustrative and does not represent the case that has just been described (where each burst of duration $t_0$ comprises at least 10 pulses of the modulation signal M).

In practice, the duration $t_0$ is, for example, between 50 μs and 600 μs. The period $T_1$ may in turn be between 1 ms and 4 ms, while the period $T_2$ is, for example, between 20 ns and 100 ns.

Due to the control of the controlled switch 6 by the modulation signal M, the current I (produced by the current generator 12) only flows in the emitting element 2 (or the emitting elements) at the instants when the modulation signal M is at the high level (i.e. during the pulses formed in this modulation signal M).

In order to obtain a particularly efficient operation, the rising edges and falling edges of the modulation signal M are of short duration.

Thus the radiation E that is required for operating the time-of-flight sensor as explained above is obtained.

However, thanks to the low-pass filter 16, the signal S received on the regulation terminal Reg of the current regulator 12 does not comprise the sharp variations present in the representative signal $V_{mes}$ and due to the interruption of the current I at the frequency of the modulation signal M.

In this respect, the low-pass filter 16 typically has a cutoff frequency of between $1/t_0$ and $1/T_2$ (that is, lower than the frequency $1/T_2$ of the modulation signal), e.g. between 20 kHz and 50 MHz.

Thus, the regulation of the current I by the current regulator 12 (by means of the regulation loop, or feedback loop, comprising the measuring element 14, the low-pass filter 16 and the regulation terminal Reg) operates correctly in spite of the rapid variations in the intensity of the current in the emitting element 2 caused by the controlled switch 6 with a view to the modulation required for the operation of the time-of-flight sensor.

It is noted that in nominal operation (the current I having reached the setpoint), the output signal S of the low-pass filter corresponds to only a proportion of the representative signal $V_{mes}$ when the current I flows in the measuring element 14 (the representative signal $V_{mes}$ being zero the rest of the time). This situation is taken into account when defining the regulation loop (e.g. by increasing the value of the resistor forming the measuring element 14 in proportion) in order to obtain the setpoint current I at the output of the current controller 12 in the presence of predetermined interruptions of this current I during a burst.

The invention claimed is:

1. An electronic circuit comprising:
   at least one radiation-emitting element;
   a power supply circuit comprising:
      a current regulator with a regulation terminal and a current-producing terminal connected to the radiation-emitting element;
      a measuring element producing a signal representative of a current flowing therethrough; and
      a conversion circuit interposed between the measuring element and the current regulator and for transforming the representative signal into a smoothed signal for the regulation terminal;
   a switch controlled by a modulation signal so as to successively open and close an electrical path passing through the current-producing terminal, the radiation-emitting element, and the measuring element; and
   a control unit controlling an emission of radiation emitted by the radiation-emitting element;
   wherein the power supply circuit is mounted between the control unit and the radiation-emitting element in series; and
   wherein the switch is mounted between the radiation-emitting element and a ground of the electronic circuit in series.

2. The electronic circuit as claimed in claim 1, wherein the radiation-emitting element is a light-emitting diode.

3. The electronic circuit as claimed in claim 1, wherein the radiation emitted by the radiation-emitting element is an infrared radiation.

4. The electronic circuit as claimed in claim 1, further comprising a plurality of emitting elements mounted in series on the electrical path.

5. The electronic circuit as claimed in claim 1, wherein the measuring element is a resistor.

6. The electronic circuit as claimed in claim 1, wherein the conversion circuit is a low-pass filter.

7. The electronic circuit as claimed in claim 6, wherein the low-pass filter includes a cutoff frequency lower than a frequency of the modulation signal.

8. The electronic circuit as claimed in claim 1, wherein the conversion circuit is a peak detector.

9. The electronic circuit as claimed in claim 1, wherein the modulation signal is periodic with a period less than 100 ns.

10. A time-of-flight sensor comprising an electronic circuit, the electronic circuit comprising:
    at least one radiation-emitting element;
    a power supply circuit comprising:
       a current regulator with a regulation terminal and a current-producing terminal connected to the radiation-emitting element;
       a measuring element producing a signal representative of a current flowing therethrough; and
       a conversion circuit interposed between the measuring element and the current regulator and for transforming the representative signal into a smoothed signal for the regulation terminal;
    a switch controlled by a modulation signal so as to successively open and close an electrical path passing through the current-producing terminal, the radiation-emitting element, and the measuring element; and
    a control unit controlling an emission of radiation emitted by the radiation-emitting element;
    wherein the power supply circuit is mounted between the control unit and the radiation-emitting element in series; and
    wherein the switch is mounted between the radiation-emitting element and a ground of the electronic circuit in series.

11. The time-of-flight sensor as claimed in claim 10, further comprising a receiving element for receiving, after reflection, the radiation emitted by the radiation-emitting element.

12. The time-of-flight sensor as claimed in claim 11, wherein the receiving element is a receiving array.

* * * * *